United States Patent [19]
Soshi et al.

[11] Patent Number: 5,694,631
[45] Date of Patent: Dec. 2, 1997

[54] CAMERA WITH FILM SCROLL DETECTION MECHANISM

[75] Inventors: Isao Soshi, Tokyo; Hidenori Miyamoto, Urayasu, both of Japan

[73] Assignee: Nikon Corporation, Tokyo, Japan

[21] Appl. No.: 723,720

[22] Filed: Sep. 30, 1996

Related U.S. Application Data

[63] Continuation of Ser. No. 618,108, Mar. 19, 1996, abandoned, which is a continuation of Ser. No. 420,131, Apr. 10, 1995, abandoned, which is a continuation of Ser. No. 161,808, Dec. 6, 1993, Pat. No. 5,430,514.

[30] Foreign Application Priority Data

Jan. 28, 1993 [JP] Japan .................... 5-012898

[51] Int. Cl.$^6$ .................................................. G03B 1/18
[52] U.S. Cl. ........................................................ 396/397
[58] Field of Search ................................. 396/387, 395, 396/396, 397, 406

[56] References Cited

U.S. PATENT DOCUMENTS 4,482,227  11/1984  Shiozawa et al. ............. 354/173.11
4,954,859   9/1990  Kitazawa ....................... 354/173.11

*Primary Examiner*—Howard B. Blankenship
*Attorney, Agent, or Firm*—Oliff & Berridge

[57] ABSTRACT

A film scroll detection mechanism for a camera does not require a large encoder for use in controlling the scrolling of the film, while still producing a large number of pulse signals, thereby allowing a camera to be made smaller. A connection mechanism links a film scroll detection roller and a pulse signal generator. The connection mechanism causes an encoder of the pulse signal generator to rotate through a larger angle in comparison to the rotation of the aforementioned film scroll detection roller. This allows the encoder to be made with a smaller radius than previous devices. Additionally, the connection mechanism permits the axis of rotation of the encoder to be offset from the axis of rotation of the film scroll detection roller, which allows for a further reduction in the size of the camera.

7 Claims, 4 Drawing Sheets

CAMERA WITH FILM SCROLL DETECTION MECHANISM

This is a Continuation of application Ser. No. 08/618,108 filed Mar. 19, 1996, now abandoned, which in turn is a Continuation of application Ser. No. 08/420,131 filed Apr. 10, 1995, now abandoned, which is turn is a Continuation of application Ser. No. 08/161,808 filed Dec. 6, 1993, now U.S. Pat. No. 5,430,514, issued Jul. 4, 1995.

BACKGROUND OF THE INVENTION

1. Field of the Invention

This invention is related to a film scroll detection mechanism of a camera.

2. Description of Related Art

FIG. 4 shows a cross-sectional view of a conventional film scroll detection mechanism of a camera. This conventional film scroll detection mechanism of a camera contains a film scroll detection roller (31), which moves in conjunction with the scrolling of the film (14), and a pulse signal generation mechanism for converting movement of the film scroll detection roller (31) into a pulse signal.

Detection of scrolling of the film is achieved by means of an encoder (33) containing transparent parts (53) and opaque parts (54) provided at certain fixed angles as shown in FIG. 3B. The encoder is placed on the same shaft as the main axis of rotation (32) of the film scroll detection roller (31), and this is supported by the main body (36) and a mounting part (35), and combined with a photo-interrupter (34). A spring 38 keeps the film (14) in contact with the film scroll detection roller (31). Item (39) is the back lid of the camera and item (37) is the back cover of the camera. Item (40) is a pressure plate that maintains film (14) in position, as is well known.

When movement of the film scroll detection roller (31) is converted into a pulse signal that is used not only for detection of the movement of one frame of the film but also, for example, as a pulse signal for the mechanism that displays the date concurrently with the scrolling of the film, a very large number of signals are required (e.g., 180 pulses per frame).

In this instance, in using the photo-interrupter to produce the pulse signal, it is necessary to have an encoder containing numerous transparent and opaque parts, each having a specified width. The reason for this is that when the width of these parts is less than the specified width, it is difficult to pass light reliably through the transparent parts, making it impossible for the photo-interrupter to perform its function accurately.

In conventional devices that use an encoder (33) that rotates the same amount as the film scroll detection roller (31), it is necessary to have a large number of transparent parts (53) and opaque parts (54) on the encoder in order to produce a requisite number of pulses.

In addition, it is necessary to have a certain width (for instance, 0.1 mm or 0.3 mm) for these transparent and opaque parts, making it necessary to enlarge the radius (f) of the encoder (33).

Furthermore, because the film scroll detection roller (31) is kept in contact with the film (14), the distance (e) from the surface of the film to the axis of the roller (31) is predetermined. As a result, when an encoder (33) with a large radius (f) is mounted directly to the roller (31) so that it shares the same axis of rotation as the film scroll detection roller, the distance (g) from the surface of the film to the back of the camera becomes large. These restrictions create a large obstacle to making the camera smaller.

SUMMARY OF THE INVENTION

Accordingly, an object of this invention is to provide a film scroll detection mechanism that does not require a large encoder for use in controlling the scrolling of the film, that can produce a large number of pulse signals, and that thereby allows the camera to be made smaller.

In order to solve the problems discussed above, as well as other problems, a camera that is equipped with a connection mechanism that links a film scroll detection roller and an encoder of a pulse signal generator so that the encoder rotates at a higher rate than the film scroll detection roller in a camera film scroll detection mechanism containing a film scroll detection roller that operates concurrently with the scrolling of the film and a pulse signal generator for converting the operation of said film scroll detection roller into a pulse signal.

With this invention, the structure linking the film scroll detection roller to the pulse signal generator, which converts the movement of the film scroll detection roller into a pulse signal, is a speed multiplying linking mechanism. Additionally, the axis of rotation of the encoder of the pulse signal generator preferably is positioned offset from the axis of rotation of the film scroll detection roller, so that the distance from the surface of the film to the back of the camera is minimized, enabling the camera to be made smaller.

BRIEF DESCRIPTION OF THE DRAWINGS

The invention will be described in detail with reference to the following drawings in which like reference numerals refer to like elements, and wherein.

DETAILED DESCRIPTION OF PREFERRED EMBODIMENTS

Figure 2:
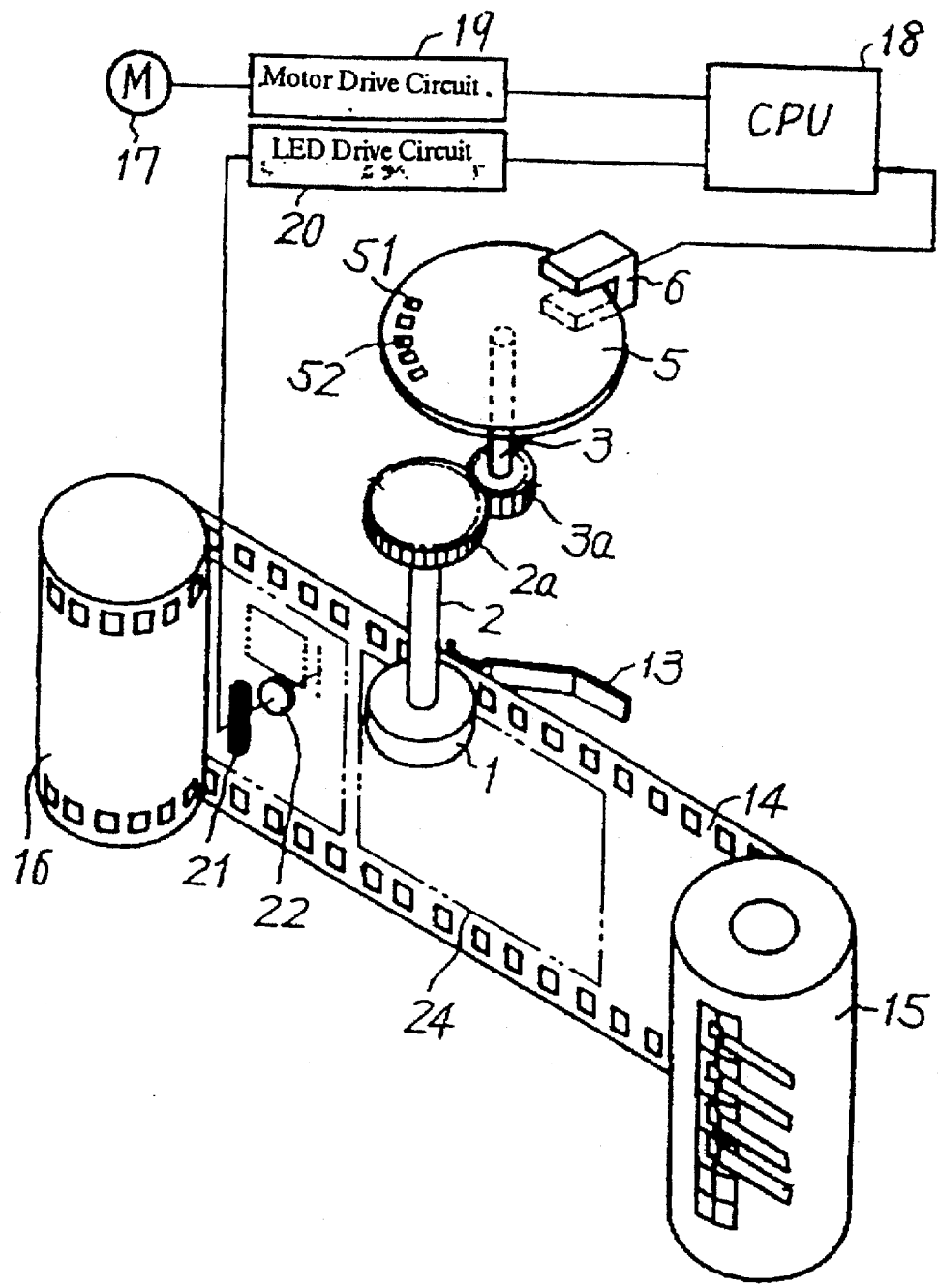
FIG. 2 shows the film scroll system of an embodiment of the invention.

FIG. 2 is a drawing showing the film scroll system according to an embodiment of this invention. The film (14) is inserted into the film cartridge chamber (15) and wound to the other spool (16) in the camera, and is kept in contact with the film scroll detection roller (1) by a spring (13). The film (14) is moved by film scroll motor (17), which is controlled by the CPU (18) through the motor drive circuit (19). The film scroll detection roller (1) rotates as the film (14) is so moved. The film scroll detection roller (1) (hereafter referred to as "the roller") and the encoder (5) are coupled to each other by a speed multiplying linking mechanism. In the illustrated embodiment of this invention, the linking mechanism includes a first gear (2a) that has 15 teeth and a second gear (3a) that has 8 teeth. The first gear (2a) rotates in synchronism with the roller (1). The second gear (3a) rotates in synchronism with encoder (5). As the roller (1) rotates one time, the encoder (5) rotates through 15/8 revolutions. In other words, the structure is such that the encoder (5) rotates more times than the roller (1).

Figure 3B:
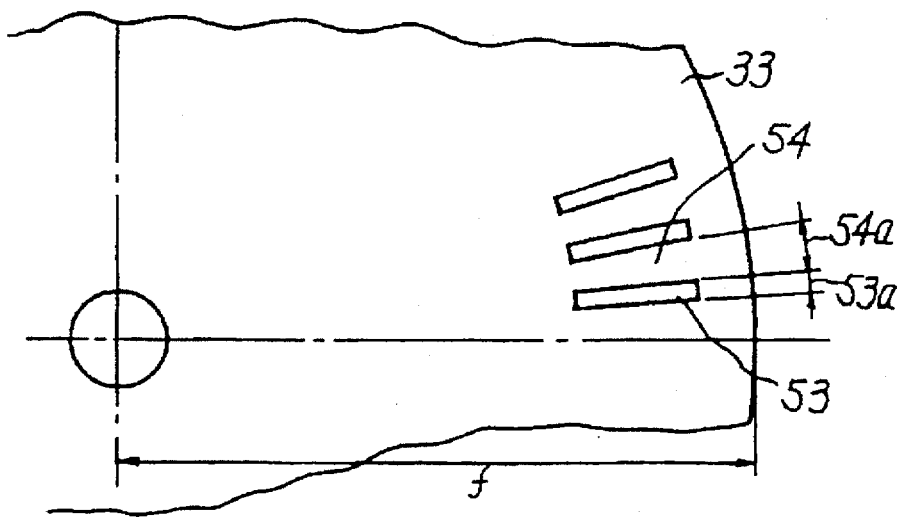
FIG. 3B is a partial view of an encoder used with conventional scroll detection systems.
Figure 3A:
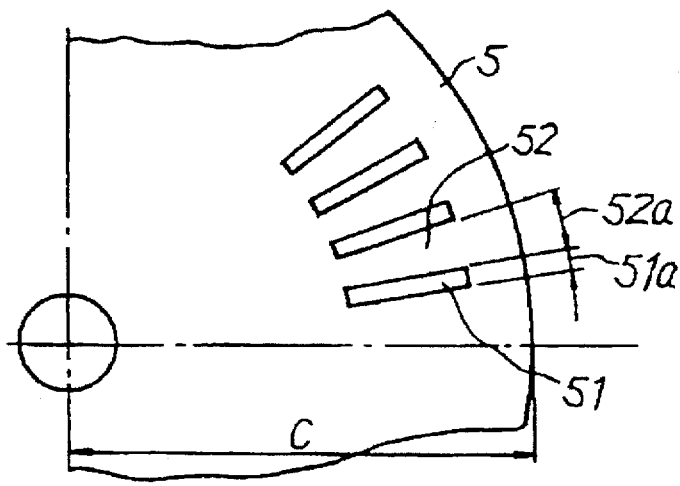
FIG. 3A is a partial view of an encoder that can be used with the invention.
Figure 4:
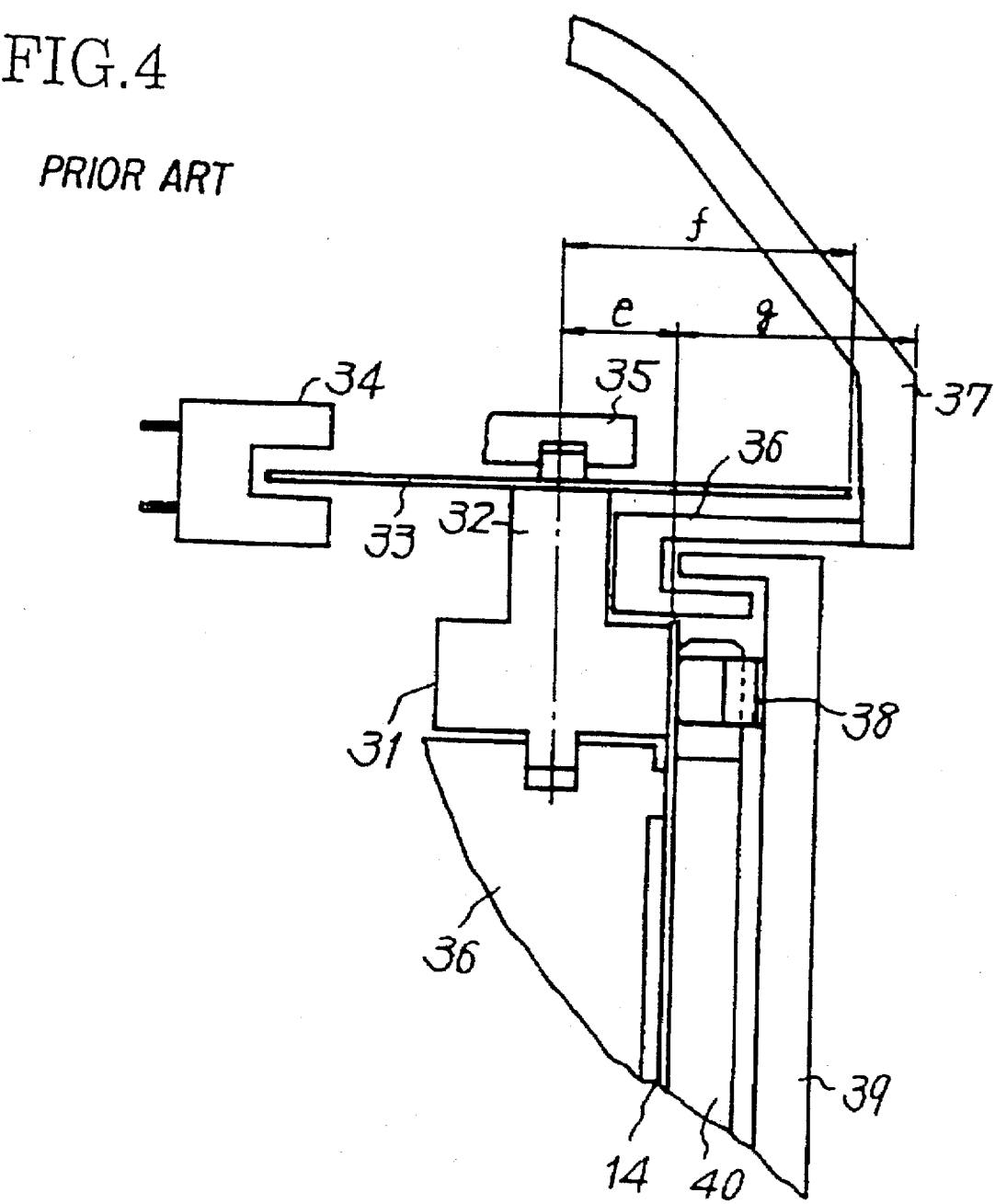
FIG. 4 is a cross-sectional view showing a conventional scroll detection structure.

On the encoder (5), opaque parts (52) and transparent parts (51) (see FIG. 3A) are installed alternately in a radial direction at each of certain specified angles of rotation. The transparent parts (51) and opaque parts (52) of the encoder (5) alternately pass between the light transmitter and the light receiver of the photo-interrupter (6) as the encoder (5) revolves, and this is detected by the photo-interrupter (6) so that a film scroll signal (FSS) is sent to the CPU (18). Furthermore, the film scroll motor (17) is controlled by the CPU (18) through the motor drive circuit (19) so that the scrolling action of the film (14) is controlled.

The broken line shown in the center of the film (14) represents the aperture screen (24). Item 22 is a condensing lens that condenses the light emitted from an LED array (21) onto the surface of the film (14). Through this structure, data (for example, the date) is displayed on the surface of the film at a predetermined position. Emission of light from the LED array (21) is controlled by the LED drive circuit (20), which is connected to the CPU.

Figure 1:
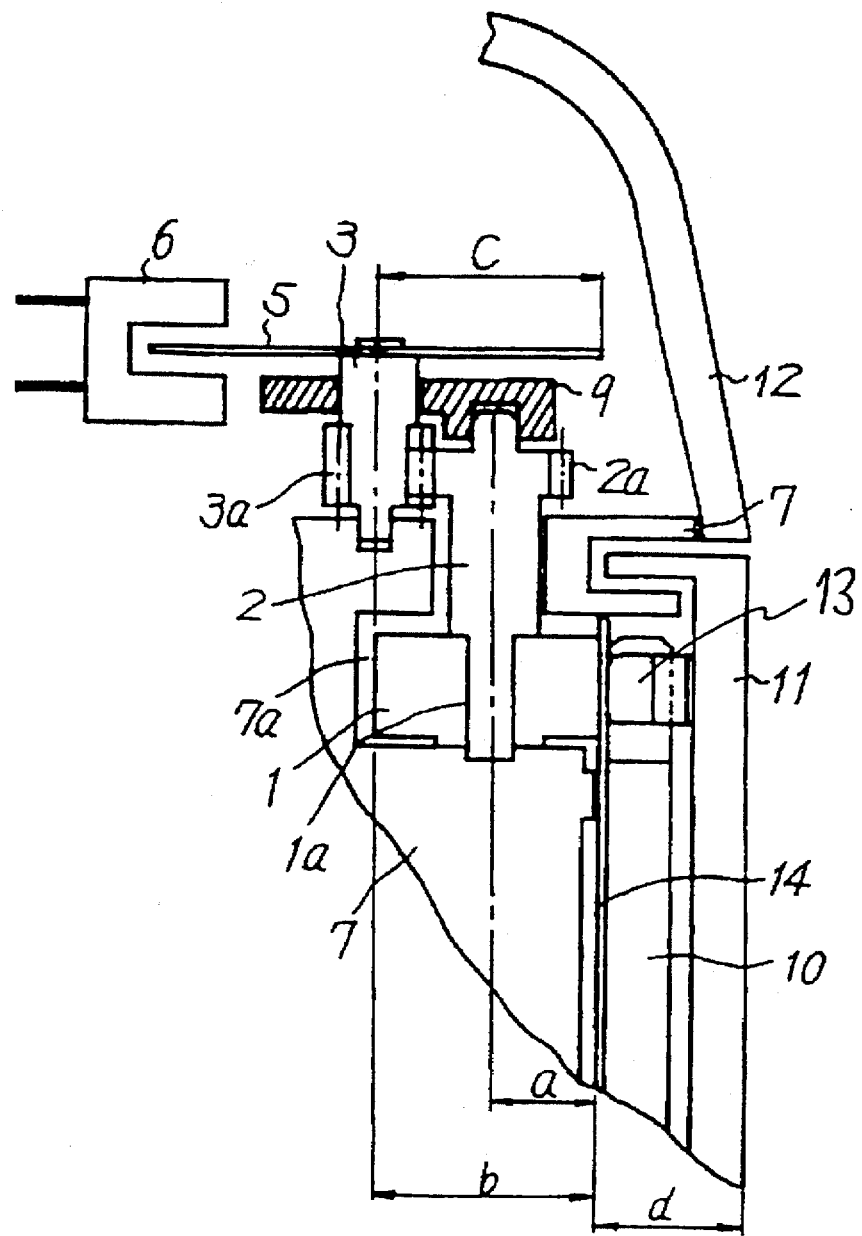
FIG. 1 is a cross-sectional view showing the structure of an embodiment of the invention.

FIG. 1 is a cross-sectional drawing showing the structure of an embodiment of this invention. The film scroll detection roller (1) is inserted into a space (7a) in the main body (7) of the camera from the back of the camera, and the roller shaft (2) containing the first gear (2a, with 15 teeth) is inserted into the roller (1) from the top so that the roller (1) and the roller shaft (2) become an integral unit. This integral unit is supported by a supporting piece (9) and the body of the camera (7) so that it can be easily assembled. The integral unit composed of the roller (1) and the roller shaft (2) rotates concurrently with the motion of the film (14) (which is maintained in position on the main body (7) by a pressure plate (10)). Item (13) is a spring attached to the back lid (11), of the camera, and item (12) is the back cover of the camera.

The encoder (5) is supported by the supporting piece (9) and the main body (7) of the camera and is attached to the encoder shaft (3) as a single piece with the second gear (3a, with 8 teeth). The second gear (3a) and the encoder shaft (3) are constructed as an integral unit. The first gear (2a) and the second gear (3a) boost the speed ratio despite the fact that they have relatively few teeth. Through this structure, the necessity of having a large number of transparent parts installed on the encoder (5) is eliminated so that the outer diameter of the encoder (5) can be reduced, thereby permitting its installation in a smaller space.

The first gear (2a) and second gear (3a) interlock, and multiply and transfer the movement of the film detection roller (1) to the encoder (5). Item (6) is the photo-interrupter that converts the motion of the encoder (5) into a pulse signal.

Supposing 180 pulses of the pulse signal are needed for a single frame of the film, because 360÷180=2, for one revolution of a conventional encoder (33), the transparent parts (53) and opaque parts (54) would have to be installed every 2 degrees. With the width of the transparent part (53a) being 0.1 mm and that of the opaque part (54a) being 0.3 mm, the radius f of the conventional encoder (33) would have to be 12 mm. This is one cause of the conventional cameras being made larger.

However, in the embodiment of this invention, because 360×(15/8)÷180=3.75 (that is, because encoder (5) will rotate through a greater angle than the conventional encoder (33) for equal roller (1 or 31) rotation), the transparent parts (51) and the opaque parts (52) have to be installed every 3.75 degrees. Therefore, when the width (51a) of the transparent parts (51) is 0.1 mm and the width (52a) of the opaque parts (52) is 0.3 mm, a radius c of 6.4 mm for encoder (5) is sufficient. This enables the size of the camera to be reduced.

Furthermore, in the illustrated embodiment of this invention, the encoder shaft (3) is positioned so that the relationship of the distance b between the encoder shaft (3) and the surface of the film and the distance a between the surface of the film and the shaft (2) of the film scroll detection roller (1) is such that a<b. This permits the distance d from the surface of the film to the back of the camera to be made smaller than the distance g from the surface of the film (14) to the back (37) of the camera in the conventional model. This enables the camera to be made even smaller.

With this invention, the structure linking the film scroll detection roller (1) and the encoder (5) forms a speed multiplying linking mechanism. This causes the encoder (5) to rotate a larger number of times (i.e., through a larger angle) than the film scroll detection roller (1). Accordingly, the number of transparent parts (51) and opaque parts (52) on the encoder (5) can be reduced in comparison to systems that do not multiply the rotation of the roller (1). The encoder (5) has a diameter c that is reduced even with fixed widths (51a, 52b) for the transparent parts (51) and the opaque parts (52).

In addition, because the axis of rotation of the encoder is positioned at the same distance or at a greater distance b from the surface of the film compared to the distance a between the surface of the film and the axis of rotation of the film scroll detection roller, the distance d from the surface of the film to the back of the camera is reduced, also allowing the camera to be made smaller.

Furthermore, because the encoder axis of rotation and the film scroll detection roller axis of rotation are not provided to the side of the supporting parts of the camera (i.e., the main body of the camera) but the axes of rotation are formed to the side of each rotating part, the speed ratio is boosted, even though only relatively few teeth are used, and the ease of assembly of the system also is improved.

Other types of linking mechanisms could be used (for example, mechanisms that include additional gears between the roller shaft (2) and the encoder shaft (3)) as long as they serve to multiply the rotation produced by the roller (1). Additionally, encoder systems different from the illustrated optical encoder also can be used. For example, encoders relying on electrical contacts or induced current type encoders also can be used.

While this invention has been described in conjunction with specific embodiments thereof, it is evident that many alternatives, modifications and variations will be apparent to those skilled in the art. Accordingly, the preferred embodiments of the invention as set forth herein are intended to be illustrative, not limiting. Various changes may be made without departing from the spirit and scope of the invention as defined in the following claims.

What is claimed is:

1. A camera film scroll detection mechanism comprising:
   a main camera body with an insertion space having an upper axial opening positioned axially above the insertion space and a lower axial opening positioned axially below the insertion space;
   a film scroll detection roller arranged within the insertion space formed in the main body;
   a roller shaft having an upper axis end, a lower axis end and a connecting shaft between the ends, the lower axis end inserting into the film scroll detection roller and protruding to be supported by the lower axial opening so the film scroll detection roller and the roller shaft are supported as a unit, the connecting shaft extending through the first axial opening with a diameter smaller than an external diameter of the film scroll detection roller; and a supporting piece that supports the upper axis end.

2. The mechanism of claim 1, wherein the film scroll detection roller rotates in response to movement of film through the camera, further comprising;

a pulse signal generator having a rotatable encoder, said pulse signal generator producing pulse signals in response to rotation of said encoder; and a linking mechanism that links said film scroll detection roller to said encoder so that said encoder rotates through an angle larger than an angle through which said film scroll detection roller rotates.

3. The mechanism of claim 2, wherein said encoder includes alternating transparent parts and opaque parts, and said pulse signal generator includes a photo-interrupter, said encoder being arranged relative to said photo-interrupter so that said transparent parts and said opaque parts pass through said photo-interrupter and cause said photo-interrupter to produce said pulse signals.

4. The mechanism of claim 2, wherein said film scroll detection roller is attached to a first gear and said encoder is attached to a second gear that engages said first gear, said first gear having a greater number of gear teeth than said second gear.

5. The mechanism of claim 2, wherein an axis of rotation of said encoder is offset from an axis of rotation of said film scroll detection roller.

6. The mechanism of claim 5, wherein said film scroll detection roller contacts a surface of a film so as to rotate with said movement of the film, and a distance between said axis of rotation of said encoder and the film is greater than a distance between said axis of rotation of said film scroll detection roller and said film.

7. A camera film scroll detection mechanism comprising:

a main camera body with an insertion space having a first axial opening positioned one of axially above and below the insertion space and a second axial opening positioned the other of axially above and below the insertion space;

a film scroll detection roller arranged within the insertion space formed in the main body;

a roller shaft having an upper axis end, a lower axis end and a connecting shaft between the ends, the lower axis end inserting into the film scroll detection roller so the film scroll detection roller and the roller shaft are supported as a unit, the connecting shaft extending through the first axial opening with a diameter smaller than an external diameter of the film scroll detection roller; and a supporting piece that supports the upper axis end.

\* \* \* \* \*